(12) United States Patent
Takahashi

(10) Patent No.: US 8,679,676 B2
(45) Date of Patent: Mar. 25, 2014

(54) NON-AQUEOUS ELECTROLYTE SECONDARY BATTERY HAVING A NITRILE COMPOUND AND A CARBOXYLIC ACID ESTER COMPOUND

(75) Inventor: Kentaro Takahashi, Sumoto (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 318 days.

(21) Appl. No.: 12/533,254

(22) Filed: Jul. 31, 2009

(65) Prior Publication Data

US 2010/0028786 A1 Feb. 4, 2010

(30) Foreign Application Priority Data

Aug. 1, 2008 (JP) ................................ 2008-200244
Jul. 22, 2009 (JP) ................................ 2009-170918

(51) Int. Cl.
*H01M 10/05* (2010.01)
*H01M 2/16* (2006.01)

(52) U.S. Cl.
USPC ........... 429/188; 429/246; 429/247; 429/326; 429/332; 429/338; 429/339

(58) Field of Classification Search
USPC ................................. 429/122–347
See application file for complete search history.

(56) References Cited

U.S. PATENT DOCUMENTS 5,462,820 A * 10/1995 Tanaka ........................ 429/174
6,682,856 B1 * 1/2004 Watanabe et al. ............. 429/326
2004/0013946 A1 1/2004 Abe et al.
2005/0170250 A1 8/2005 Ohzuku et al.
2007/0148552 A1 6/2007 Ikemoto et al.
2008/0038644 A1 2/2008 Abe et al.
2009/0170005 A1 * 7/2009 Kimishima et al. .......... 429/249

FOREIGN PATENT DOCUMENTS

| JP | 2001/229971 A | 8/2001 |
| JP | 2002-338730 A | 11/2002 |
| JP | 2003-59529 A | 2/2003 |
| JP | 2004-179146 A | 6/2004 |
| JP | 2006032301 A * | 2/2006 |
| JP | 2007-510270 A | 4/2007 |
| JP | 2007-519186 A | 7/2007 |
| JP | 2007/305549 A | 11/2007 |
| JP | 2008/077950 A | 4/2008 |
| JP | 2008/097876 A | 4/2008 |
| JP | 2008-120930 A | 5/2008 |
| WO | 2005/061599 A1 | 7/2005 |
| WO | 2005/069423 A1 | 7/2005 |
| WO | 2005/078832 A1 | 8/2005 |
| WO | 2005/122318 A1 | 12/2005 |
| WO | WO 2007052663 A1 * | 5/2007 |

OTHER PUBLICATIONS

Machine Translation of JP 2006-032301 originally published to Kawashima on Feb. 2006.*

* cited by examiner

*Primary Examiner* — Jonathan G Leong
(74) *Attorney, Agent, or Firm* — Westerman, Hattori, Daniels & Adrian, LLP

(57) ABSTRACT

Provided is a non-aqueous electrolyte secondary battery which has excellent high-temperature cycle characteristics, while maintaining the shutdown response speed of the separator and the overcharge characteristics after many repeated cycles at high temperatures. The battery uses a non-aqueous electrolyte containing a carboxylic acid ester and a nitrile compound, and a separator having a porosity of 28 to 54% and an air permeability of 86 to 450 secs/dl.

9 Claims, No Drawings

NON-AQUEOUS ELECTROLYTE SECONDARY BATTERY HAVING A NITRILE COMPOUND AND A CARBOXYLIC ACID ESTER COMPOUND

BACKGROUND OF THE INVENTION

1. Field of the Invention

The present invention relates to a non-aqueous electrolyte secondary battery, and more particularly, to a non-aqueous electrolyte secondary battery having excellent battery characteristics such as high-temperature cycle characteristics and overcharge characteristics.

2. Background Art

Portable information terminals such as portable telephones and notebook personal computers are becoming increasingly sophisticated and reduced in size and weight in recent years. These terminals use as portable power supplies non-aqueous electrolyte secondary batteries such as lithium-ion secondary batteries with high energy density and high capacity.

These secondary batteries use a non-aqueous electrolyte containing a non-aqueous solvent which contains carbonates such as ethylene carbonate (EC) or propylene carbonate (PC). These solvents, however, have poor stability during overcharging, and hence batteries using them do not have good overcharge characteristics.

It is possible to improve the safety against overcharging by making the non-aqueous carbonate-based solvent contain a carboxylic acid ester which is more resistant to charge and discharge than the solvent.

Carboxylic acid esters, however, weaken the negative electrode film, which is formed on the negative electrode surface during charge and discharge, thereby decreasing the high-temperature cycle characteristics of the batteries. Therefore, when the batteries are subjected to repeated charge-discharge cycles at temperatures higher than 60° C., their battery capacities decrease substantially.

Patent Document 1 discloses a lithium secondary battery with an electrolyte containing a cyclic carbonate and/or a cyclic ester, an alkyne derivative, and a tertiary carboxylic acid ester. This document states in paragraph 0004 that carboxylic acid esters, which have lower boiling points than chain carbonates, easily cause battery swelling and other problems during evaporation.

Patent Documents 2 and 3, on the other hand, state that adding an aliphatic nitrile compound to a non-aqueous electrolyte provides beneficial effects such as preventing accidental battery ignition, and reducing an increase in the viscosity of the electrolytic solution and a decrease in low-temperature performance. Patent Documents 2 and 3, however, do not mention a combination of a carboxylic acid ester and a nitrile compound.

Patent Document 4, on the other hand, discloses in paragraphs 0050 and 0051 a non-aqueous electrolyte secondary battery which has a non-aqueous electrolytic solution containing a carboxylic acid ester (n-butyl pivalate) and adiponitrile. This document, however, is not a technique focused on decreasing the shutdown response speed of a separator or the overcharge characteristics after many repeated cycles at high temperatures.

Patent Document 1: Japanese Patent Unexamined Publication No. 2003-59529
Patent Document 2: Japanese Translation of PCT Publication No. 2007-510270
Patent Document 3: Japanese Translation of PCT Publication No. 2007-519186
Patent Document 4: Japanese Patent Unexamined Publication No. 2004-179146

SUMMARY OF THE INVENTION

Adding a carboxylic acid ester to a non-aqueous electrolyte improves overcharge characteristics, but reduces high-temperature cycle characteristics. The inventors of the present invention have examined the decrease in the high-temperature cycle characteristics caused when the non-aqueous electrolyte contains a carboxylic acid ester. As a result, they have found that the high-temperature cycle characteristics can be improved by combining a carboxylic acid ester with a nitrile compound. They have also found, however, that adding a nitrile compound to a non-aqueous electrolyte containing a carboxylic acid ester causes a substantial decrease in the shutdown response speed of the separator and in the overcharge characteristics after many repeated cycles at high temperatures.

In view of this problem, the present invention has an object of providing a non-aqueous electrolyte secondary battery which has excellent battery characteristics such as high-temperature cycle characteristics, while maintaining the shutdown function of the separator and the overcharge characteristics after repeated cycles at high temperatures.

The Basic Structure of the Present Invention

In order to achieve the object, the non-aqueous electrolyte secondary battery of the present invention includes:
a positive electrode;
a negative electrode;
a separator for providing electrical isolation between the positive electrode and the negative electrode, the separator having a porosity of 28 to 54% and an air permeability of 86 to 450 secs/dl; and
a non-aqueous electrolyte containing an electrolyte salt, a nitrile compound, and a non-aqueous solvent containing a carboxylic acid ester.

The term "porosity" means the ratio of the pore volume per unit volume of the separator. The term "air permeability" represents a value indicating the state of the fine pores of the separator, and means the number of seconds required to pass one deciliter of air (secs/dl) through the separator at a constant pressure. The separator is required to provide electrical isolation between the positive and negative electrodes and to have fine pores through which lithium ions can pass. The separator is also required to have a shutdown function of blocking the passage of the ions by automatically closing the fine pores when the battery temperature rises to an abnormal level.

The following is a description of the technical meaning of the basic structure of the present invention. The present invention uses a non-aqueous electrolyte containing a carboxylic acid ester and a nitrile compound in order to improve high-temperature cycle characteristics. The present invention also uses a separator having a porosity of 28 to 54% and an air permeability of 86 to 450 secs/dl in order to prevent the shutdown function from being decreased by the nitrile compound added to the non-aqueous electrolyte. This structure reduces the negative effects of decreasing the shutdown response speed and the overcharge characteristics, which are resulted from the use of a nitrile compound.

Thus, the basic structure of the present invention provides a non-aqueous electrolyte battery excelling in high-temperature cycle characteristics, shutdown response characteristics, and overcharge characteristics.

In the basic structure of the present invention, the non-aqueous solvent may contain 5 to 80% by mass of the carboxylic acid ester.

The non-aqueous solvent may contain 10 to 70% by mass of the carboxylic acid ester.

The carboxylic acid ester in the non-aqueous solvent may be a tertiary carboxylic acid ester.

The carboxylic acid ester in the non-aqueous solvent may be a tertiary carboxylic acid ester selected from the group consisting of methyl trimethylacetate and ethyl trimethylacetate.

0.3 to 5 parts by mass of the nitrile compound may be added to 100 parts by mass of the non-aqueous solvent.

1 to 3 parts by mass of the nitrile compound may be added to 100 parts by mass of the non-aqueous solvent.

The nitrile compound may be a dinitrile compound expressed by Formula 1:

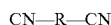    (Formula 1)

wherein R represents an alkylne group having 2 to 8 carbon atoms.

The nitrile compound may be a dinitrile compound selected from the group consisting of adiponitrile, pimelonitrile, succinonitrile, and glutaronitrile.

The separator may have a mean pore diameter in the range of 0.04 to 0.17 μm when measured by a vapor-liquid process.

The separator may be made of polyolefin, and preferably starts to be shut down at temperatures of 110° C. to 145° C., and more preferably at temperatures of 120° C. to 140° C.

Specific examples of the carboxylic acid ester used in the present invention include tertiary carboxylic acid esters, secondary carboxylic acid esters, primary carboxylic acid esters, fluorocarboxylic acid esters, and cyclic carboxylic acid esters. The tertiary carboxylic acid esters include methyl pivalate, ethyl pivalate, propyl pivalate, isopropyl pivalate, butyl pivalate, isobutyl pivalate, hexyl pivalate, octyl pivalate, dodecyl pivalate, 2-butyl trimethylacetate, tert-butyl trimethylacetate, 2,2-dimethylbutanoic acid methyl, and 2,2-dimethylbutanoic acid ethyl. The secondary carboxylic acid esters include methyl isobutyrate, ethyl isobutyrate, propyl isobutyrate, and tert-butyl isobutyrate. The primary carboxylic acid esters include methyl acetate, ethyl acetate, propyl acetate, isopropyl acetate, tert-butyl acetate, methyl propionate, ethyl propionate, isopropyl propionate, and tert-butyl propionate. The fluorocarboxylic acid esters include trifluoromethyl propionate and trifluoroethyl propionate. The cyclic carboxylic acid esters include γ-butyrolactone and γ-valerolactone. Particularly preferred among them are tertiary carboxylic acid esters such as methyl pivalate (methyl trimethylacetate) and ethyl pivalate (ethyl trimethylacetate). These carboxylic acid esters may be used in combination of two or more thereof.

Specific examples of the nitrile compound used in the present invention include acetonitrile, propionitrile, butyronitrile, valeronitrile, hexanenitrile, octanenitrile, undecanenitrile, cyclohexanecarbonitrile, benzonitrile, succinonitrile, glutaronitrile, 2-methylglutaronitrile, adiponitrile, pimelonitrile, suberonitrile, azelanitrile, sebaconitrile, undecanedinitrile, dodecanedinitrile, 1,2,3-propanetricarbonitrile, 1,2,3-tris(2-cyanoethoxy)propane, 1,3,5-cyclohexanetricarbonitrile, 1,3,5-pentanetricarbonitrile, tert-butylmalononitrile, malononitrile, 3,3'-oxydipropionitrile, 3,3'-thiodipropionitrile, 1,2-dicyanobenzene, 1,3-dicyanobenzene, and 1,4-dicyanobenzene. These nitrile compounds may be used in combination of two or more thereof.

The nitrile compound used in the present invention is preferably a dinitrile compound expressed by Formula 1 below, more preferably adiponitrile, pimelonitrile, succinonitrile, or glutaronitrile, and particularly preferably adiponitrile.

    (Formula 1)

wherein R represents an alkylne group having 2 to 8 carbon atoms.

Adding a nitrile compound to a non-aqueous electrolyte containing a carboxylic acid ester hinders the shutdown function, thereby decreasing the shutdown response speed of the separator. The reason of this is not known, but is probably as follows. Adding a nitrile compound to a non-aqueous electrolyte containing a carboxylic acid ester causes the nitrile compound to react with the positive electrode during charge and then to form a film. The film is partially broken into film fragments, which move during charge and discharge, and deposit inside the fine pores of the separator and their vicinity. The deposits prevent the fine pores from being closed when the separator is melted by heat. The technical meaning of the physical properties of the separator specified in the present invention will be described based on this assumption.

Separators used for non-aqueous electrolyte batteries are required to have the contradictory functions of ion permeability and isolation, and also the function of irreversibly blocking the ion permeability at an emergency (so-called shutdown function). Conventional batteries, however, have not had a problem of the shutdown response speed being reduced by the deposits of the film fragments. Therefore, the relation between the deposits of the film fragments and the shutdown response speed has been unknown. The inventors of the present invention have examined the relation between the film fragments derived from nitrile compounds and the porosity and air permeability of the separator.

It is generally considered that increasing the porosity or decreasing air permeability of the separator reduces the clogging of the fine pores due to the film fragments, thereby preventing a decrease in the shutdown response speed. The inventors have found, however, that this is not true, and that increasing the porosity and decreasing the air permeability of the separator does not always provide satisfactory results. These facts imply that too high a porosity and/or too low an air permeability of the separator causes the film fragments to permeate into the separator in a short time and deposit there, thereby rather hindering the shutdown function. When the porosity is too low and/or the air permeability of the separator is too high, on the other hand, many of the film fragments deposit in the vicinity of the positive electrode side of the separator, thereby hindering the closing of the fine pores when the separator is shut down. The inventors have found that these adverse actions to the shutdown function are substantially reduced when the porosity and air permeability of the separator are set to 28 to 54% and 86 to 450 secs/dl, respectively. This effect is considered to be the result of the specific physical property values of the separator, that is, a porosity of 28 to 54% and an air permeability of 86 to 450 secs/dl in the relation with the property, shape, size, and other characteristics of the film fragments. Thus, the separator having a porosity of 28 to 54% and an air permeability of 86 to 450 secs/dl is considered to provide a specific effect on the film fragments derived from nitrile compounds.

The non-aqueous electrolyte secondary battery of the present invention has excellent battery characteristics such as high-temperature cycle characteristics, while maintaining the shutdown function of the separator and the overcharge characteristics after repeated cycles at high temperatures.

DETAILED DESCRIPTION OF THE INVENTION

A preferred embodiment of the present invention will be described as follows based on specific examples. The present invention is not limited to the following examples, and can be implemented by being properly changed within the scope of the invention.

First Group of Batteries

With a first group of batteries (Examples 1 to 21 and Comparative Examples 1 to 5), the relation between the composition of a non-aqueous solvent, the type and amount of an additive, and battery characteristics were examined using the same separator.

Example 1

1. Assembly of the Battery

Production of the Positive Electrode

First, 95% by mass of lithium cobalt oxide ($LiCoO_2$) as a positive electrode active material was mixed with 2.5% by mass of carbon black as a conductive agent, 2.5% by mass of polyvinylidene fluoride as a binder, and N-methylpyrrolidone (NMP) so as to prepare a slurry. The slurry was applied (the amount of coating: 380 g/m$^2$) to a 12 μm thick aluminum foil as a current collector. Then, the slurry was dried to eliminate NMP and pressure molded (packing density: 3.70 g/cc) so as to produce a positive electrode plate.

Production of the Negative Electrode

First, 95% by mass of artificial graphite (d=0.335 nm) as a negative electrode active material was mixed with 3% by mass of carbon black as a conductive agent, 1% by mass of CMC as a binder, 1% by mass of styrene-butadiene rubber (SBR) as a binder, and some water so as to prepare a slurry. The slurry was applied (the amount of coating: 165 g/m$^2$) to an 8 μm thick copper foil current collector. Then, the slurry was dried to eliminate water and pressure molded (packing density: 1.60 g/cc) so as to produce a negative electrode plate.

Preparation of a Non-Aqueous Electrolyte

A non-aqueous solvent was prepared by mixing ethylene carbonate (EC), propylene carbonate (PC), and methyl trimethylacetate (MTMA) in a mass percent ratio of 30:20:50. Then, 1 part by mass of adiponitrile (ADPN) was added to 100 parts by mass of the non-aqueous electrolyte solvent. In addition, $LiPF_6$ as an electrolyte salt was dissolved at 1 mol/L in this mixture solvent so as to form a non-aqueous electrolyte.

Separator "A" Group

A separator "A" was prepared from a 12 μm thick polyethylene microporous film having a porosity of 35% and an air permeability of 390 secs/dl.

Assembly of the Battery

The positive and negative electrode plates thus produced were cut in size and welded to collector tabs. Then, the separator "A" was interposed between the positive and negative electrode plates, and they were wound together to form an electrode assembly. This electrode assembly was put into an outer can, and the can was filled with the non-aqueous electrolyte prepared as described above so as to complete a lithium-ion secondary battery (theoretical capacity: 750 mAh, electrode area: 450 cm$^2$).

2. Tests and Measurements

High-Temperature Cycle Characteristics Test

Batteries were subjected to a cycle characteristics test as follows. The batteries were charged at a constant current of 750 mA until the battery voltage reached 4.20V, and then charged at 4.20V until the current value reached 37 mA. Next, the batteries were discharged at a constant current of 750 mA until the voltage reached 2.75V. The charging and discharging were performed at 60° C. These series of charge-discharge operations, which are referred to as one cycle, were repeated for 300 cycles. The batteries were measured for the discharge capacity after the first and 300th cycles, and the value indicating cycle characteristics was calculated based on the calculation formula below.

$$\text{Cycle characteristic value (\%)} = (\text{discharge capacity at the 300th cycle}/(\text{discharge capacity at the first cycle}) \times 100$$

Overcharge Characteristics Measurement

Batteries were charged from a discharged state at different current rates at normal temperature. The maximum current value at which no explosion, ignition, or smoke had been caused was defined as a limiting current, which indicates overcharge characteristics. The measurement was applied to both fresh products and those which underwent the 300 cycle test.

Shutdown Characteristics Measurement

Batteries in a discharged state were heated to 160° C. at a rate of 2.5° C./min. and the impedance of the batteries were measured. Then, the shutdown response speed was calculated based on the calculation formula below.

$$\text{shutdown response speed } (\Omega \cdot cm^2/sec) = \text{the maximum value of the rate of impedance rise per second } (\Omega/sec) \times \text{electrode area } (cm^2)$$

Porosity Measurement

Separators were taken out of fresh products and cut in a size of 20 cm$^2$ so as to measure their volumes (cm$^3$) and masses (g). Then, porosity was calculated based on the calculation formula below.

$$\text{porosity (\%)} = (\text{volume } (cm^3) - \text{mass } (g)/\text{density } (g/cm^3))/\text{volume } (cm^3) \times 100$$

When the separator is a microporous film made of a single material, the density (g/cm$^3$) of the material is measured. In Examples and Comparative Examples which use a polyethylene microporous film, the density is 0.950 g/cm$^3$, which is the density of high-density polyethylene. When the separator is a microporous film made of composite resin material, the microporous film is melted to calculate the density from the mass and volume of the melted microporous film.

Air Permeability Measurement

Separators were measured for air permeability in terms of Gurley permeability compliant with JIS P8117 under the following test conditions:
 pressure: 0.01224 atm
 film area: 6.395 cm$^2$
 the amount of permeated air: 100 cc (1 deciliter)

Mean Pore Diameter Measurement

Separators were measured for the mean pore diameter as follows. It is known that a fluid inside a capillary follows Poiseuille flow when the mean free path of the fluid is smaller than the pore diameter of the capillary, whereas the fluid follows Knudsen flow when the path is larger than the pore diameter of the capillary. It is assumed that the air flow in the air permeability measurement compliant with JIS P-8117 follows the Knudsen flow and the water flow in the water permeability measurement at normal temperature follows the Poiseuille flow. Then, the mean pore diameter d (m) can be calculated from an equation (1) below using the permeation rate constant of air: Rgas, the permeation rate constant of water: Rliq, the viscosity of water: (Pa sec), the standard pressure: Ps (=101325 Pa), and the molecular speed of air: v (m/sec).

$$d = 2v(Rliq/Rgas)(16\eta/3)(1/Ps) \quad (1)$$

Rgas is calculated from air permeability Pgas (sec) using an equation (2) below.

$$Rgas(m^3/(m^2 \cdot sec \cdot Pa)) = 0.0001/Pgas/0.0006395/ (0.01224 \times 101325) \quad (2)$$

Rliq is calculated from water permeability Pliq(cm³/(cm²·sec·atm)) using an Equation (3) below.

$$Rliq(m^3/(m^2 \cdot sec \cdot Pa)) = Pliq/1000000/0.0001/101325 \quad (3)$$

v is calculated from gas constant R(8.314), absolute temperature T(K), circle ratio π, and average molecular weight of air M(kg/mol) using an Equation (4) below.

$$v^2 = 8RT/\pi M \quad (4)$$

Example 2

Batteries were prepared in the same manner as in Example 1 except for adding 3 parts by mass (3% by mass) of adiponitrile to the non-aqueous electrolyte solvent (100 parts by mass).

Example 3

Batteries were prepared in the same manner as in Example 1 except for adding 5 parts by mass (5% by mass) of adiponitrile to the non-aqueous electrolyte solvent (100 parts by mass).

Example 4

Batteries were prepared in the same manner as in Example 1 except for adding 0.3 parts by mass (0.3% by mass) of adiponitrile to the non-aqueous electrolyte solvent (100 parts by mass).

Example 5

Batteries were prepared in the same manner as in Example 1 except for adding 1 part by mass (1% by mass) of succinonitrile instead of the adiponitrile.

Example 6

Batteries were prepared in the same manner as in Example 1 except for adding 1 part by mass (1% by mass) of sebaconitrile instead of the adiponitrile.

Example 7

Batteries were prepared in the same manner as in Example 1 except for adding 1 part by mass (1% by mass) of undecanedinitrile instead of the adiponitrile.

Example 8

Batteries were prepared in the same manner as in Example 1 except for adding 1 part by mass (1% by mass) of butyronitrile instead of the adiponitrile.

Example 9

Batteries were prepared in the same manner as in Example 1 except that the non-aqueous electrolyte solvent had a composition of EC:PC:MTMA in a mass percent ratio of 20:10:70.

Example 10

Batteries were prepared in the same manner as in Example 1 except that the non-aqueous electrolyte solvent had a composition of EC:PC:MTMA in a mass percent ratio of 30:30:40.

Example 11

Batteries were prepared in the same manner as in Example 1 except that the non-aqueous electrolyte solvent had a composition of EC:PC:MTMA in a mass percent ratio of 35:25:40.

Example 12

Batteries were prepared in the same manner as in Example 1 except that the non-aqueous electrolyte solvent had a composition of EC:PC:MTMA in a mass percent ratio of 35:30:35.

Example 13

Batteries were prepared in the same manner as in Example 1 except that the non-aqueous electrolyte solvent had a composition of EC:PC:MTMA in a mass percent ratio of 50:20:30.

Example 14

Batteries were prepared in the same manner as in Example 1 except that the non-aqueous electrolyte solvent had a composition of EC:PC:MTMA in a mass percent ratio of 50:40:10.

Example 15

Batteries were prepared in the same manner as in Example 1 except that the non-aqueous electrolyte solvent had a composition of EC:PC:MTMA in a mass percent ratio of 50:45:5.

Example 16

Batteries were prepared in the same manner as in Example 1 except that the non-aqueous electrolyte solvent had a composition of EC:MTMA in a mass percent ratio of 20:80.

Example 17

Batteries were prepared in the same manner as in Example 1 except that the non-aqueous electrolyte solvent had a composition of EC:butylene carbonate (BC):MTMA in a mass percent ratio of 30:20:50.

Example 18

Batteries were prepared in the same manner as in Example 1 except that the non-aqueous electrolyte solvent had a composition of EC:PC:ethyl trimethylacetate (ETMA) in a mass percent ratio of 30:20:50.

Example 19

Batteries were prepared in the same manner as in Example 1 except that the non-aqueous electrolyte solvent had a composition of EC:PC:2,2-dimethyl methyl butyrate (DMMB) in a mass percent ratio of 30:20:50.

Example 20

Batteries were prepared in the same manner as in Example 1 except that the non-aqueous electrolyte solvent had a composition of EC:PC:methyl isobutyrate (MIB) in a mass percent ratio of 30:20:50.

Example 21

Batteries were prepared in the same manner as in Example 1 except that the non-aqueous electrolyte solvent had a composition of EC:PC:ethyl isobutyrate (EIB) in a mass percent ratio of 30:20:50.

Comparative Example 1

Batteries were prepared in the same manner as in Example 1 except for not adding adiponitrile to the non-aqueous electrolyte.

Comparative Example 2

Batteries were prepared in the same manner as in Example 1 except for not using MTMA and making the non-aqueous electrolyte solvent have a composition of EC:PC in a mass percent ratio of 55:45.

Comparative Example 3

Batteries were prepared in the same manner as in Example 1 except for using diethyl carbonate (DEC) instead of MTMA and making the non-aqueous electrolyte solvent have a composition of EC:PC:DEC in a mass percent ratio of 30:20:50.

Comparative Example 4

Batteries were prepared in the same manner as in Example 1 except for not using MTMA, not adding adiponitrile, and making the non-aqueous electrolyte solvent have a composition of EC:PC in a mass percent ratio of 55:45.

Comparative Example 5

Batteries were prepared in the same manner as in Example 1 except for using DEC instead of MTMA, not adding adiponitrile, and making the non-aqueous electrolyte solvent have a composition of EC:PC:DEC in a mass percent ratio of 30:20:50.

The results of the battery characteristics of the first group of batteries (Examples 1 to 21 and Comparative Examples 1 to 5) are shown in Table 1.

TABLE 1

| | Non-aqueous solvent composition (% by mass) | | | fresh product | 300 cycle test (60° C.) | | |
|---|---|---|---|---|---|---|---|
| | Non-aqueous solvent | (% by mass) | nitrile (*.) | overcharge limiting current (It) | cycle characteristics (%) | shutdown response speed ($\Omega \cdot cm^2$/sec) | overcharge limiting current (It) |
| Example 1 | EC/PC/MTMA | 30/20/50 | ADPN 1% | 3.1 | 84 | 2910 | 3.3 |
| Example 2 | " | 30/20/50 | ADPN 3% | 3.1 | 79 | >3000 | 3.1 |
| Example 3 | " | 30/20/50 | ADPN 5% | 3.0 | 64 | 2890 | 3.2 |
| Example 4 | " | 30/20/50 | ADPN 0.3% | 2.9 | 76 | 2850 | 2.9 |
| Example 5 | " | 30/20/50 | SCN 1% | 3.2 | 77 | >3000 | 3.1 |
| Example 6 | " | 30/20/50 | SBN 1% | 3.3 | 81 | >3000 | 3.0 |
| Example 7 | " | 30/20/50 | UDDN 1% | 3.2 | 76 | >3000 | 3.0 |
| Example 8 | " | 30/20/50 | BN 1% | 3.0 | 59 | 2670 | 2.8 |
| Example 9 | " | 20/10/70 | ADPN 1% | 2.9 | 73 | >3000 | 3.0 |
| Example 10 | " | 30/30/40 | ADPN 1% | 2.8 | 81 | >3000 | 2.9 |
| Example 11 | " | 35/25/40 | ADPN 1% | 2.8 | 79 | >3000 | 2.8 |
| Example 12 | " | 35/30/35 | ADPN 1% | 2.9 | 78 | >3000 | 2.8 |
| Example 13 | " | 50/20/30 | ADPN 1% | 2.7 | 66 | >3000 | 3.1 |
| Example 14 | " | 50/40/10 | ADPN 1% | 2.5 | 65 | >3000 | 3.0 |
| Example 15 | " | 50/45/5 | ADPN 1% | 2.1 | 67 | 2690 | 2.3 |
| Example 16 | EC/MTMA | 20/80 | ADPN 1% | 2.8 | 65 | 2980 | 2.5 |
| Example 17 | EC/BC/MTMA | 30/20/50 | ADPN 1% | 2.8 | 80 | >3000 | 2.9 |
| Example 18 | EC/PC/ETMA | 30/20/50 | ADPN 1% | 3.1 | 85 | >3000 | 3.0 |

TABLE 1-continued

| | Non-aqueous solvent composition (% by mass) | | | fresh product overcharge limiting current (It) | 300 cycle test (60° C.) | | |
|---|---|---|---|---|---|---|---|
| | Non-aqueous solvent | (% by mass) | nitrile (*.) | | cycle characteristics (%) | shutdown response speed (Ω · cm²/sec) | overcharge limiting current (It) |
| Example 19 | EC/PC/DMMB | 30/20/50 | ADPN 1% | 3.2 | 83 | >3000 | 3.0 |
| Example 20 | EC/PC/MIB | 30/20/50 | ADPN 1% | 2.8 | 68 | >3000 | 2.8 |
| Example 21 | EC/PC/EIB | 30/20/50 | ADPN 1% | 2.9 | 66 | 2540 | 2.5 |
| Compar. Example 1 | EC/PC/MTMA | 30/20/50 | — | 3.0 | 49 | >3000 | 2.7 |
| Compar. Example 2 | EC/PC | 55/45 | ADPN 1% | 1.3 | 40 | >3000 | 1.3 |
| Compar. Example 3 | EC/PC/DEC | 30/20/50 | ADPN 1% | 0.7 | 85 | >3000 | 0.8 |
| Compar. Example 4 | EC/PC | 55/45 | — | 1.2 | 43 | >3000 | 1.3 |
| Compar. Example 5 | EC/PC/DEC | 30/20/50 | — | 0.8 | 84 | >3000 | 0.7 |

(*.) parts by mass to 100 parts by mass of the non-aqueous solvent.
EC: ethylene carbonate
PC: propylene carbonate
BC: butylene carbonate
DEC: diethyl carbonate
MTMA: methyl trimethylacetate (methyl pivalate)
ETMA: ethyl trimethylacetate (ethyl pivalate)
DMMB: 2,2-dimethyl methyl butyrate
MIB: methyl isobutyrate
EIB: ethyl isobutyrate
ADPN: adiponitrile
SCN: succinonitrile
SBN: sebaconitrile
UDDN: undecanedinitrile
BN: butyronitrile
Separator "A": a porosity of 35% and an air permeability of 390 secs/dl Comparison Between Example 1 and Comparative Example 1 to 2

The 300 cycle test at 60° C. reveals that Comparative Example 1, which contains MTMA but does not contain ADPN, is far inferior in the cycle characteristics (high-temperature cycle characteristics) to Example 1 and has a little lower overcharge limiting current (It) than Example 1.

Comparative Example 2, which contains ADPN but does not contain MTMA, is inferior in the overcharge limiting currents (It) both as fresh products and after the 300 cycles and is far inferior in the high-temperature cycle characteristics to Example 1.

Example 1, which contains both MTMA and ADPN, on the other hand, exhibits excellent values in all the test items shown in Table 1.

Comparison Between Comparative Examples 2 to 5

Comparative Examples 2 to 5, which do not contain MTMA, exhibit low overcharge limiting currents (It) both as fresh products and after the 300 cycles. The comparison between Comparative Examples 2 and 4 indicates that adding ADPN to the non-aqueous solvent not containing a carboxylic acid ester does not result in an improvement in the high-temperature cycle characteristics.

Comparison Between Examples 1 to 4

Examples 1 to 4, which contain ADPN in the range of 0.3 to 5 parts by mass, exhibit excellent battery characteristics. This indicates that the amount of ADPN to be added is preferably in the range of 0.3 to 5 parts by mass.

Note, however, that Example 3, which contains 5 parts by mass of ADPN, is inferior in the high-temperature cycle characteristics to Examples 1 and 2, and that Example 4, which contains 0.3 parts by mass of ADPN, is inferior in the shutdown response speed to Examples 1 and 2. These results indicate that the amount of ADPN to be added is preferably 1 to 3 parts by mass as in Examples 1 and 2.

Comparison Between Example 1 and Example 5 to 8

Examples 5 to 8, which use succinonitrile, sebaconitrile, undecanedinitrile, and butyronitrile, respectively, instead of ADPN (adiponitrile), exhibit nearly the same excellent results as Example 1. Note, however, that Example 8 using butyronitrile, which is not dinitrile exhibits a little worse results in the 300 cycle test than Examples 5 to 7.

Comparison Between Example 1 and Examples 9 to 16

Example 1 and Examples 9 to 16 have been compared to examine the ratio of MTMA in the non-aqueous electrolyte solvent. Examples 1 and 9 to 12, which have 35 to 70% by mass of MTMA, exhibit excellent results in all the characteristics. Example 16, which has 80% by mass of MTMA, exhibits slightly low high-temperature cycle characteristics and slightly low overcharge limiting current (It) after 300 cycles.

Examples 13 and 14, which have 30% and 10% by mass, respectively, of MTMA, exhibit slightly low high-temperature cycle characteristics. Example 15, which has 5% by mass of MTMA, exhibits rather poor results in all the characteristic values.

These results indicate that the amount of a carboxylic acid ester in the whole mass of the non-aqueous solvent is preferably 10 to 70% by mass, and more preferably 35 to 70% by mass.

Comparison Between Example 1 and Examples 18 to 21

Examples 18 to 21, which use ETMA, DMMB, MIB, and EIB, respectively, as a carboxylic acid ester instead of MTMA used in Example 1, exhibit better characteristic values than all of Comparative Examples 1 to 5. Note, however, that Example 20 using MIB and Example 21 using EIB, which are not tertiary carboxylic acid esters, exhibit values slightly lower than the other Examples.

These results indicate that adding a nitrile compound to a non-aqueous solvent containing a carboxylic acid ester can prevent a decrease in the high-temperature cycle characteristics caused by the addition of the carboxylic acid ester. The reason for this is considered as follows.

The carboxylic acid ester in the non-aqueous electrolyte weakens a film formed on the negative electrode surface, thereby decreasing the function of protecting the negative electrode. This causes an oxidation product generated on the positive electrode surface to move to the negative electrode surface and to be subjected to a reduction reaction there. The reduction reaction generates a reductive decomposition product, which deposits on the negative electrode. The reductive decomposition product causes impedance distribution along the negative electrode surface, and hence, a non-uniform electrochemical reaction. As a result, long-term cycle characteristics decrease. On the other hand, adding a nitrile compound to the non-aqueous electrolyte forms a film on the positive electrode surface, thereby suppressing the generation of the oxidation product on the positive electrode surface. This reduces the generation of the reductive decomposition product on the negative electrode surface so as to prevent the generation of the non-uniform reaction, thereby reducing a decrease in high-temperature cycle characteristics.

Separator "B" Group

As described above, the first group of batteries shown in Table 1 uses the separator "A" having a porosity of 35% and an air permeability of 390 secs/dl. Comparative Examples 6 to 18, on the other hand, use a separator "B" having a porosity 35% and an air permeability of 465 secs/dl. Comparative Examples 6 to 18 were evaluated for their battery characteristics in the same manner as in Table 1. The results are shown in Table 2.

TABLE 2

| | Non-aqueous solvent composition (% by mass) | | | fresh | 300 cycle test (60° C.) | | |
|---|---|---|---|---|---|---|---|
| | Non-aqueous solvent | (% by mass) | nitrile (*) | product overcharge limiting current (It) | cycle characteristics (%) | shutdown response speed ($\Omega \cdot cm^2/sec$) | overcharge limiting current (It) |
| Compar. Example 6 | EC/PC/MTMA | 30/20/50 | — | 3.1 | 46 | >3000 | 2.9 |
| Compar. Example 7 | " | 30/20/50 | BN 1% | 3.0 | 63 | 580 | 0.9 |
| Compar. Example 8 | " | 30/20/50 | SCN 1% | 3.0 | 75 | 632 | 1.0 |
| Compar. Example 9 | " | 30/20/50 | ADPN 0.3% | 3.1 | 78 | 515 | 1.2 |
| Compar. Example 10 | " | 30/20/50 | ADPN 1% | 3.3 | 79 | 910 | 1.1 |
| Compar. Example 11 | " | 30/20/50 | ADPN 3% | 3.1 | 74 | 320 | 0.9 |
| Compar. Example 12 | " | 30/20/50 | SBN 1% | 3.2 | 79 | 490 | 1.1 |
| Compar. Example 13 | " | 20/10/70 | ADPN 1% | 3.0 | 78 | 580 | 1.2 |
| Compar. Example 14 | " | 30/30/40 | ADPN 1% | 3.2 | 79 | 590 | 1.1 |
| Compar. Example 15 | EC/PC | 55/45 | ADPN 1% | 1.2 | 44 | >3000 | 1.3 |
| Compar. Example 16 | EC/PC/DEC | 30/20/50 | ADPN 1% | 0.7 | 82 | >3000 | 0.8 |
| Compar. Example 17 | EC/PC | 55/45 | — | 1.2 | 49 | >3000 | 1.2 |
| Compar. Example 18 | EC/PC/DEC | 30/20/50 | — | 0.7 | 83 | >3000 | 0.7 |

(*) parts by mass to 100 parts by mass of the non-aqueous solvent.

In Table 2, the comparison between Comparative Example 6 and the other Comparative Examples reveals the following.

Of Comparative Examples 6 to 14 using a non-aqueous solvent containing a carboxylic acid ester (MTMA), Comparative Example 6, which does not contain a nitrile compound, exhibits poor results in the high-temperature cycle characteristics, but excellent results in the shutdown response speed of the separator and in the overcharge limiting current (It) after 300 cycles. Comparative Examples 7 to 14, which contain both a carboxylic acid ester and a nitrile compound, on the other hand, exhibit sufficient high-temperature cycle characteristics, but exhibit poor results in the shutdown response speed of the separator and in the overcharge limiting current (It) after 300 cycles.

Examples 19 to 25) has been examined for the relation between the battery characteristics and the conditions (porosity and air permeability) of the separator. This examination has been performed by changing the conditions of the separator and making the composition of the non-aqueous solvent and the type and amount of the nitrile compound to be added the same as in Example 1.

The second group of batteries was prepared in the same manner as in Example 1 except for setting the porosity and air permeability of the separator to the values shown in Table 3. Data related to the characteristics of the batteries are also shown in Table 3.

TABLE 3

| | separator | | fresh product | | 300 cycle test (60° C.) | | |
| --- | --- | --- | --- | --- | --- | --- | --- |
| | | | shutdown response | overcharge | | shutdown response | overcharge |
| | porosity (%) | air permeability (secs/dl) | speed ($\Omega \cdot cm^2/sec$) | limiting current (It) | cycle characteristics (%) | speed ($\Omega \cdot cm^2/sec$) | limiting current (It) |
| Compar. Example 19 | 26 | 79 | >3000 | 3.2 | 82 | 234 | 1.0 |
| Compar. Example 20 | 26 | 310 | >3000 | 3.3 | 82 | 762 | 0.9 |
| Example 22 | 28 | 360 | >3000 | 3.0 | 79 | >3000 | 3.3 |
| Compar. Example 21 | 36 | 60 | >3000 | 3.1 | 86 | 682 | 1.2 |
| Example 23 | 35 | 160 | >3000 | 3.2 | 84 | >3000 | 3.2 |
| Example 1 | 35 | 390 | >3000 | 3.1 | 84 | 2910 | 3.3 |
| Example 24 | 36 | 450 | >3000 | 3.0 | 80 | >3000 | 2.9 |
| Compar. Example 22 | 35 | 465 | >3000 | 3.3 | 79 | 910 | 1.1 |
| Compar. Example 23 | 54 | 80 | >3000 | 3.1 | 84 | 723 | 1.0 |
| Example 25 | 54 | 86 | >3000 | 3.3 | 82 | 1974 | 3.4 |
| Example 26 | 54 | 270 | >3000 | 3.3 | 79 | 2030 | 3.0 |
| Example 27 | 54 | 380 | >3000 | 2.9 | 83 | 1972 | 3.1 |
| Compar. Example 24 | 58 | 290 | >3000 | 3.3 | 79 | 341 | 1.2 |
| Compar. Example 25 | 58 | 460 | >3000 | 3.2 | 85 | 482 | 1.1 |

The intercomparison between Comparative Examples 6 to 18 indicates that the decrease in the shutdown response speed of the separator after 300 cycles is observed only in the case where the non-aqueous electrolyte contains both a carboxylic acid ester and a nitrile compound.

This reveals that none of the batteries using the separator "B" exhibit excellent results both in the high-temperature cycle characteristics and in the overcharge characteristics.
Second Group of Batteries The results from Comparative Examples 6 to 18 shown in Table 2 reveal that the battery characteristics are greatly affected by the conditions of the separator. Therefore, a second group of batteries (Examples 22 to 27 and Comparative All the fresh products of the second group of batteries shown in Table 3 have a shutdown response speed of >3000 ($\Omega \cdot cm^2/sec$), and excellent overcharge limiting currents (It). The batteries of Comparative Examples, however, show a great decrease in the shutdown response speed and in the overcharge limiting current (It) in the 300 cycle test. This will be described in detail as follows.

Comparison Between Examples 1 and 23 to 27, and Comparative Examples 21 to 23

(1) As shown in Table 3, Examples 1, 23, and 24 and Comparative Examples 21 and 22 have nearly the same porosity of 35 to 36% and different air permeability from each other. Comparative Example 21 having an air permeability of 60 secs/dl and Comparative Example 22 having an air permeability of 465 secs/dl exhibit a remarkable decrease in the shutdown response speed after 300 cycles. Examples 1, 23, and 24 having an air permeability in the range of 160 to 450 secs/dl show almost no decrease in the shutdown response speed.

These results reveal that the air permeability preferably has a lower limit between 60 and 160 secs/dl, and an upper limit at 450 secs/dl.

(2) Examples 25 to 27 and Comparative Example 23 have the same porosity of 54% and different air permeability from each other (80 to 380 secs/dl). The comparison between Comparative Example 23 and Example 25 indicates that they have a small difference in the air permeability, namely, 80 secs/dl and 86 secs/dl, but are remarkably different from each other in the decrease in the shutdown response speed and the overcharge limiting current (It) after 300 cycles. More specifically, Comparative Example 23 has a shutdown response speed after 300 cycles, which is 1/2.7 times the speed in Example 25, and an overcharge limiting current (It), which is 1/3.4 times the current in Example 25.

(3) These results indicates that in order to prevent a large decrease in the shutdown response speed after 300 cycles, the air permeability is required to be not less than 86 secs/dl, preferably not less than 160 secs/dl and not to exceed 450 secs/dl.

Comparison Between Examples 22, 26, and 27, and Comparative Examples 19, 20, 24, and 25

(1) Comparative Examples 19 and 20, which have the same porosity of 26% and greatly different air permeability from each other, show a great decrease in the shutdown response speed and the overcharge limiting current (It) after 300 cycles. Example 22 having a porosity of 28% and an air permeability of 360 secs/dl, on the other hand, shows no decrease in the shutdown response speed and in the overcharge limiting current (It) after 300 cycles.

Comparative Example 20 has an air permeability of 310 secs/dl, and as described above, when the air permeability is not less than 160 secs/dl, no decrease is caused in the battery characteristics in the 300 cycle test. This means that the difference in the battery characteristics after 300 cycles between Comparative Example 20 and Example 22 is due to the difference in porosity, namely, 26% and 28%, between them. As a result, the separator is required to have a porosity of not less than 28%.

(2) The comparison between Examples 26 to 27 and Comparative Examples 24 to 25 reveals that Comparative Example 24 has remarkably lower shutdown response speed and overcharge limiting current (It) after 300 cycles than Examples 26 and 27. Comparative Example 24 has an air permeability of 290 secs/dl, which is between 270 secs/dl of Example 26 and 380 secs/dl of Example 27. This means that the difference in the battery characteristics between Examples 26, 27 and Comparative Example 24 is considered to be due to the difference in the porosity, namely, the difference between 54% and 58%. Thus, when the porosity exceeds 54%, the shutdown response speed and overcharge limiting current (It) after 300 cycles greatly decrease. Therefore, the separator is required to have a porosity of not less than 54%.

(3) Thus, the porosity of the separator is required to be not less than 28% and not more than 54%.

The reason for the decrease in the shutdown response speed and the overcharge characteristics after 300 cycles at 60° C. when the non-aqueous electrolyte contains both a carboxylic acid ester and a nitrile compound is considered to be as follows. A positive electrode film, which is formed on the positive electrode surface during charge and discharge, comes off and the resulting film fragments deposit in the fine pores of the separator and their vicinity. The deposits clog the fine pores of the separator and block the passage of the lithium ions therethrough, thereby decreasing the shutdown function. It is considered that the separator having well-controlled porosity and air permeability reduces the adverse effects of the deposits, that is, inhibiting the function of passing lithium ions therethrough and the function of shutting down the passage of lithium ions, thereby improving the shutdown response speed and overcharge limiting current (It) after many repeated cycles.

Third Group of Batteries

A third group of batteries (Examples 28 to 34) have been examined for the relation between the battery characteristics and the fine pore diameters of the separator.

The third group of batteries was prepared in the same manner as in Example 1 except for using separators having porosities, air permeabilities, and pore diameters shown in Table 4. The battery characteristics have been examined in the same manner as in Example 1, and the results are shown in Table 4.

TABLE 4

| | separator | | | fresh product | | 300 cycle test (60° C.) | |
|---|---|---|---|---|---|---|---|
| | porosity (%) | air permeability (secs/dl) | pore diameter (μm) | cycle characteristics (%) | overcharge limiting current (It) | cycle characteristics (%) | overcharge limiting current (It) |
| Example 28 | 36 | 390 | 0.02 | >3000 | 3.2 | 78.5 | 2.1 |
| Example 29 | 35 | 380 | 0.04 | >3000 | 3.2 | 83.1 | 3.0 |
| Example 30 | 35 | 390 | 0.05 | >3000 | 3.1 | 83.9 | 3.3 |
| Example 31 | 35 | 395 | 0.09 | >3000 | 3.2 | 84.3 | 3.2 |
| Example 32 | 36 | 376 | 0.11 | >3000 | 3.2 | 82.1 | 3.2 |
| Example 33 | 36 | 360 | 0.17 | >3000 | 3.3 | 79.9 | 3.1 |
| Example 34 | 35 | 370 | 0.22 | >3000 | 3.1 | 80.3 | 2.0 |

Examples 28 to 34 exhibit excellent battery characteristics; however, Examples 29 to 33 are different from Examples 28 and 34 in the overcharge limiting current (It) after 300 cycles. More specifically, Examples 29 to 33 having mean pore diameters in the range of 0.04 to 0.17 μm exhibit overcharge limiting currents (It) of 3.0 to 3.3 after 300 cycles, whereas Examples 28 and 34 having mean pore diameters outside this range exhibit overcharge limiting currents (It) of 2.1 and 2.0 after 300 cycles.

These results reveal that the mean fine pore diameter of the separator is more preferably 0.04 to 0.17 μm.

Additions

The non-aqueous electrolyte solvent of the present invention can also contain a cyclic carbonate, a chain carbonate, a cyclic ether, an amide compound, a sulfur compound, or an ambient temperature molten salt beside a carboxylic acid ester. They may be used in combination of two or more thereof. Examples of the cyclic carbonate include ethylene carbonate, propylene carbonate, and butylene carbonate. Examples of the chain carbonate include dimethyl carbonate (DMC), ethyl methyl carbonate (EMC), and diethyl carbonate (DEC). Examples of the cyclic ether include tetrahydrofuran and 1,4-dioxane. Examples of the amide compound include N,N-dimethylformamide and N-methyl oxazolidinone. Examples of the sulfur compound include sulfolane. Examples of the ambient temperature molten salt include 1-ethyl-3-methylimidazolium tetrafluoroborate and 1-butylpyridinium tetrafluoroborate. The non-aqueous electrolyte solvent can also contain a cyclic carbonate ester derivative containing halogen atoms to inhibit the decomposition of the solvent when the positive electrode is at a high potential. Specific examples of the cyclic carbonate ester derivative include 4-fluoro-1,3-dioxolane-2-one, 4,5-difluoro1,3-dioxolane-2-one, 4-chloro-1,3-dioxolane-2-one, and 4-trifluoromethyl-1,3-dioxolane-2-one. Preferred among them is 4-fluoro-1,3-dioxolane-2-one. These derivatives may be used in combination of two or more thereof.

The non-aqueous electrolyte solvent can also contain vinylene carbonate (VC), vinylethylene carbonate (VEC), succinic anhydride, maleic anhydride, glycolic anhydride, 1,3-propane sultone, 1,3-propene sultone, ethylene sulfite (ES), divinyl sulfone, vinyl acetate (VA), vinyl pivalate, tert-amylbenzene (t-AB), tert-butylbenzene (t-BB), 1,3-dioxane (1,3-DOX), 1,3-dioxolane (1,3-DOXL), catechol carbonate, cyclohexylbenzene (CHB), or biphenyl. They may be used in combination of two or more thereof.

Preferable examples of the positive electrode active material used in the present invention include lithium composite oxides such as $LiCoO_2$, $LiNiO_2$, $LiMn_2O_4$, $LiMnO_2$, $LiNi_{1-x}Mn_xO_2$ ($0<x<1$), $LiNi_{1-x}Co_xO_2$ ($0<x<1$), $LiNi_xMn_yCo_zO_2$ ($0<x, y,$ and $z<1$, $x+y+z=1$), and phosphate compounds having an olivine structure such as $LiFePO_4$.

Preferable examples of the negative electrode active material used in the present invention include carbon materials such as graphite, non-graphitizing carbon, and graphitizing carbon; titanium oxides such as $LiTiO_2$ and $TiO_2$; metalloid elements such as silicon and tin; and Sn—Co alloy.

INDUSTRIAL APPLICABILITY

The non-aqueous electrolyte secondary battery of the present invention is excellent in high-temperature cycle characteristics and ensures safety by maintaining the shutdown response speed of the separator and the overcharge characteristics after repeated cycles at high temperatures, thus providing high industrial applicability.

What is claimed is:

1. A non-aqueous electrolyte secondary battery comprising:
    a positive electrode;
    a negative electrode;
    a microporous separator for providing electrical isolation between the positive electrode and the negative electrode, the microporous separator consisting essentially of polyethylene and having a porosity of 28 to 54% and an air permeability of 86 to 395 secs/dl; and
    a non-aqueous electrolyte containing an electrolyte salt, a nitrile compound, and a non-aqueous solvent containing a carboxylic acid ester,
wherein:
    the carboxylic acid ester is selected from the group consisting of methyl trimethylacetate, ethyl trimethylacetate, 2,2-dimethyl methyl butyrate, methyl isobutyrate and ethyl isobutyrate; and
    the nitrile compound is selected from the group consisting of adiponitrile, succinonitrile, sebaconitrile, undecanedinitrile and butyronitrile;
    the non-aqueous solvent contains ethylene carbonate and 5 to 80% by mass of the carboxylic acid ester; and
    0.3 to 5 parts by mass of the nitrile compound is added to 100 parts by mass of the non-aqueous solvent.

2. The non-aqueous electrolyte secondary battery of claim 1, wherein
    the non-aqueous solvent contains 10 to 70% by mass of the carboxylic acid ester.

3. The non-aqueous electrolyte secondary battery of claim 1, wherein
    1 to 3 parts by mass of the nitrile compound is added to 100 parts by mass of the non-aqueous solvent.

4. The non-aqueous electrolyte secondary battery of claim 1, wherein
    the microporous separator has a mean pore diameter in a range of 0.04 to 0.17 μm when measured by a vapor-liquid process.

5. The non-aqueous electrolyte secondary battery of claim 1, wherein
    the microporous separator has an air permeability of 86 to 360 secs/dl.

6. The non-aqueous electrolyte secondary battery of claim 1, wherein
    the microporous separator consists of polyethylene.

7. The non-aqueous electrolyte secondary battery of claim 1, wherein
    the microporous separator has an air permeability of 86 to 360 secs/dl and consists of polyethylene.

8. The non-aqueous electrode secondary battery of claim 1, wherein
    the microporous separator starts to be shut down at a temperature of 110° C. to 145° C.

9. The non-aqueous electrolyte secondary battery of claim 1, wherein
    the non-aqueous solvent further contains propylene carbonate.

* * * * *